No. 877,233. PATENTED JAN. 21, 1908.
G. D. ROSS.
WHEEL FOR MOTOR VEHICLES.
APPLICATION FILED DEC. 28, 1906.

Witnesses:
Q. F. Nagle
L. Douville

Inventor:
George Dow Ross
By Wiedersheim & Fairbanks
Attorneys.

UNITED STATES PATENT OFFICE.

GEORGE DOW ROSS, OF GLASGOW, SCOTLAND.

WHEEL FOR MOTOR-VEHICLES.

No. 877,233.  Specification of Letters Patent.  Patented Jan. 21, 1908.

Application filed December 28, 1906. Serial No. 349,764.

*To all whom it may concern:*

Be it known that I, GEORGE DOW ROSS, of 42 Calder street, Govanhill, Glasgow, Scotland, engineer, have invented an Improved Wheel for Motor-Vehicles, of which the following is a specification.

This invention relates to an improved construction of wheel for motor cars and other motor vehicles.

My new wheel, which I may call the "eccentric wheel" consists of an ordinary pneumatic tired wheel surrounded by and working within a second outer wheel or ring, said outer wheel or ring being interposed between the pneumatic tire of the inner wheel and the road. The outer wheel or ring is made larger than the inner wheel and is free to move relatively therewith and its internal diameter is larger than the external diameter of the inner wheel, so that the latter, when the car is running, takes up a position eccentric to the outer wheel or ring. The pneumatic tire of the inner wheel never comes in contact with the road and is therefore not liable to puncture and, owing to the eccentric arrangement, it only bears on a small part of the inner circumference of the outer wheel with the result that shocks and jars communicated to the outer wheel are felt no more than with an ordinary pneumatic tired wheel. The outer wheel may be provided with a rubber or other tire.

Under my invention the inner wheel has at each side thereof bearings provided with anti-friction metal while the outer wheel has removable side plates which bear on these bearings with a tight fit so as to exclude dust and dirt and retain the wheel in position. The anti-friction metal reduces the friction due to the working between the bearings and the plates.

In order that my said invention may be properly understood I have hereunto appended two explanatory sheets of drawings which show, by way of illustration or example, a mode of constructing a motor car wheel.

Figure 2:
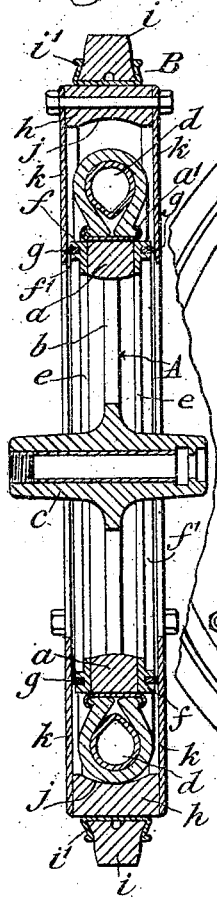
Figure 1:
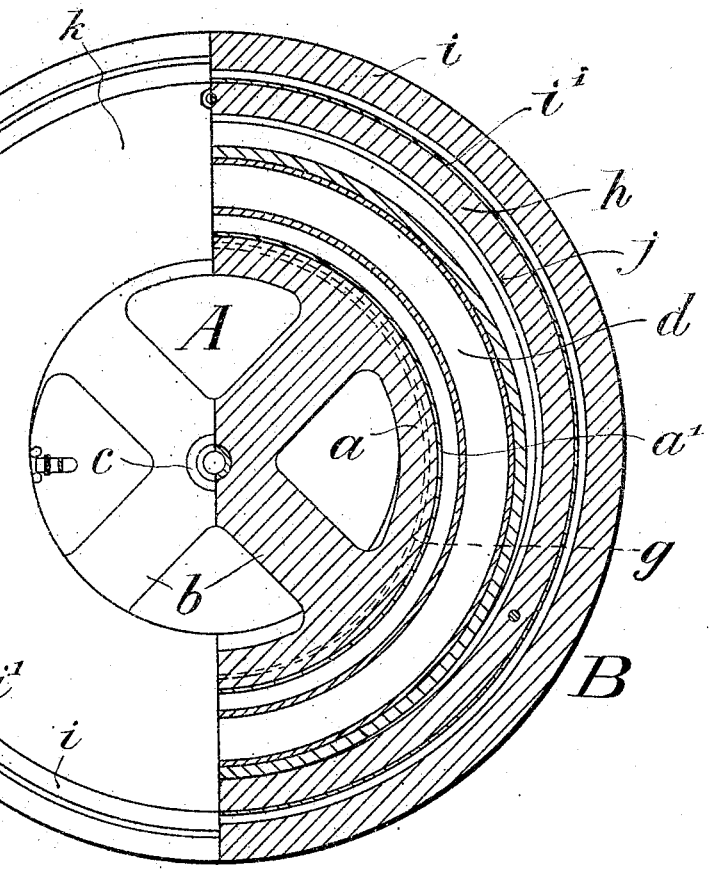

Figure 1 is a part side view and part vertical section of the motor car wheel. Fig. 2 is a vertical cross section of the same.

In carrying out my invention I use an ordinary pneumatic tired wheel A consisting of an inner wooden or other rim $a$ carried by spokes $b$ radiating from the hub $c$ and provided with a metal rim $a^1$ and pneumatic tire $d$. Secured on each side of the rim $a$ is a metal ring $e$ made with two concentric outstanding flanges $f$, $f^1$, and fitted in the annular channels formed by the flanges is anti-friction metal $g$. Surrounding this pneumatic tired wheel is an outer wheel or ring B, whose internal diameter is greater than the external diameter of the pneumatic tired wheel. This outer wheel or ring is interposed between the pneumatic tire of the inner wheel and the road, and consists of a wooden or other rim $h$ provided with a metal rim $i^1$ and a rubber or other tire $i$. The internal surface $j$ of the rim $h$ of the outer wheel is preferably made slightly concave and constitutes a track or bearing surface for the pneumatic tire $d$ of the inner wheel. The breadth of the rim $h$ is made just equal to the distance between the outer faces of the two anti-friction rings $g$ so that lateral movement of the outer wheel relative to the inner wheel can be prevented by means of the rings or plates $k$, $k$, which are bolted or otherwise removably secured one on each side of the rim $h$. These rings or plates besides holding the outer wheel in position on the inner wheel also serve to exclude dust and dirt from the pneumatic tire $d$.

It will be seen that the pneumatic tire of the inner wheel A bears only at its under side on the surface $j$ of the rim $h$ the position assumed by it relatively with the wheel B being an eccentric one. The pneumatic tire would be inflated in the usual manner.

The car axles being supported by the wheels A provided with the pneumatic tires $d$ insure the minimum of jolt and vibration while the tires themselves being protected from contact with the road are not liable to puncture. The outer tire $i$ being hard and comparatively narrow is not very liable to side slip or skid.

To insure an effectively working wheel of this character, it is necessary to have a light construction of wheel, and to this end side plates are provided, said side plates being made of steel and being removably secured in position. It is also necessary, in order to reduce friction to have bearings provided with anti-friction metal, said bearings working tightly against the side plates so as to prevent lateral play. If there is lateral play considerable vibration and noise is created.

1. A wheel for motor vehicles comprising, in combination, two wheels, one arranged within the other, the inner one being a pneumatic tired wheel while the outer one consists of a wheel or ring having an internal diameter larger than the external diameter of the pneumatic tire of the inner wheel and being free to move relatively with said inner wheel, side plates on the outer wheel and bearings arranged between the inner wheel and said side plates, said bearings being provided with anti-friction metal.

2. A wheel for motor vehicles comprising, in combination, a rotatable wheel, a wheel so fitted outside of the rotatable wheel as to be capable of independent movement thereon, annular and laterally projecting bearings provided with anti-friction packing on the sides of the rim of the inner wheel and side plates attached to the rim of the outer wheel said side plates being adapted to work on said packing.

3. A wheel for motor vehicles comprising, in combination, a rotatable wheel, a wheel so fitted outside of the rotatable wheel as to be capable of independent movement thereon, annular side channels on the rim of the inner wheel, antifriction metal in the channels and side plates on the outer wheel.

4. In combination, a wheel with a pneumatic tire thereon, a second wheel outside of the pneumatic tired wheel and having a spokeless rim, flat steel plates removably secured to the rim and annular and laterally projecting bearings provided with anti-friction packing on the sides of the pneumatic tired wheel, said packing bearing against said plates.

5. In combination, a wheel with a pneumatic tire thereon, a second wheel arranged eccentrically outside of the pneumatic tired wheel and having a spokeless rim, side plates secured to the rim and annular anti-friction metal rings on the sides of the pneumatic tired wheel.

6. A wheel for motor vehicles comprising, in combination, a rotatable wheel, a wheel so fitted outside of the rotatable wheel as to be capable of independent movement thereon, side rings on the rim of the inner wheel, said rings having laterally projecting annular flanges, anti-friction metal inserted between the flanges and side plates secured to the rim of the outer wheel.

7. In combination, a wheel with a pneumatic tire thereon, a second wheel outside of the pneumatic tired wheel, and having a spokeless rim, flat steel plates of circular form, said plates being secured at their outer edges to the rim and being free at their inner edges and annular bearings of anti-friction metal on the side of the pneumatic tired wheel.

8. A wheel for motor vehicles comprising, in combination, an inner wheel, an outer wheel capable of independent movement on the inner wheel, side plates bolted to the rim of the outer wheel, said side plates extending inwardly to such an extent as to cover the rim of the inner wheel, a rubber tire on the outer wheel, a pneumatic tire on the inner wheel, side rings secured to the rim of the inner wheel, concentric lateral flanges on said rings and rings of anti-friction metal fitted between the said flanges.

In testimony whereof I affix my signature in presence of two witnesses.

GEORGE DOW ROSS.

Witnesses:
WILLIAM FLEMING,
JAMES AIKEN.